F. Snyder.
Horse Hay Fork.

N° 66,530. Patented Jul. 9, 1867.

Witnesses

Inventor

Frederick Snyder

FREDERICK SNYDER, OF HINKLETOWN, PENNSYLVANIA.

*Letters Patent No. 66,530, dated July 9, 1867.*

IMPROVEMENT IN HORSE HAY-FORKS.

*The Schedule referred to in these Letters Patent and making part of the same.*

TO ALL WHOM IT MAY CONCERN:

Be it known that I, FREDERICK SNYDER, of Hinkletown, in the county of Lancaster, and State of Pennsylvania, have invented a new and improved arrangement in the construction of Horse Hay-Forks or Elevators; and I do hereby declare that the following is a full and exact description thereof, reference being had to the accompanying drawings making a part of this specification, in which—

Figures 1, 2, 3:
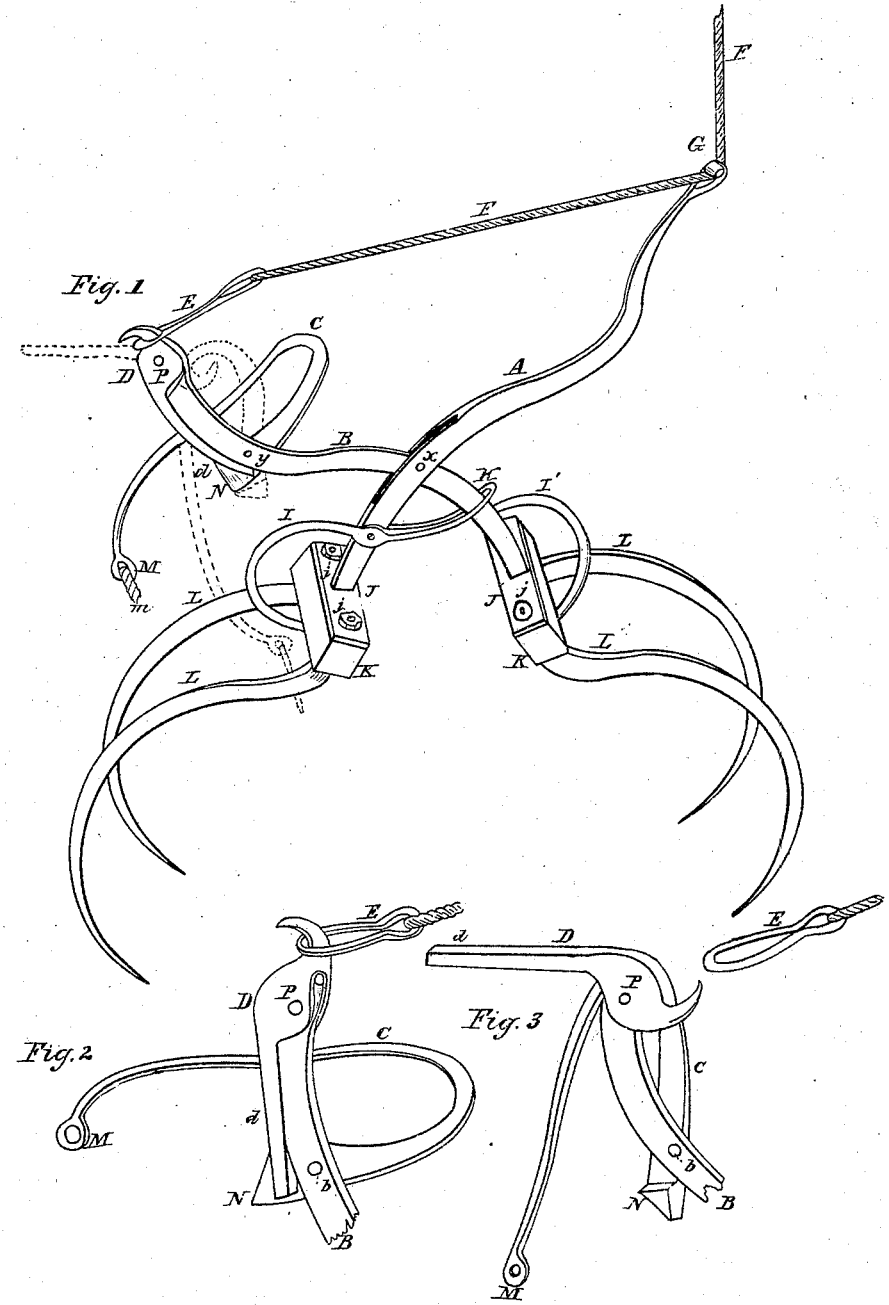
Figure 1 is a perspective view of the several parts in position when set and spread open in the act of grasping.
Figure 2 shows the hook-headed cap or bar D, held by the tripper C on its triangular shoulder N, with the hitching link E on the hook.
Figure 3 shows the same parts, when the dog or capped hook bar D is disengaged. The dotted lines in fig. 1 indicate the same change of parts in that position.

The nature of my invention consists in providing a horse hay-fork that will grasp to its fullest capacity and retain what it grasps, and is more especially adapted for clover or short hay, well dried, in which latter kind many of the elevators now in use fail to give satisfaction. This arrangement, after a fair trial, operates admirably, and has proved to be easily managed, and to a good purpose, in unloading hay with speed.

The drawing clearly shows the construction, and a brief description will enable any one skilled in the art to make and use my invention.

The heads or blocks K, through which the tines L are passed, are covered on the top with an iron plate, J, on the top of which the tines are held by a burr, j, as shown, two in each block. The curved tines L are made after the ordinary most approved pattern. Centrally, between the tines, through the head-block and plate K J, are affixed the cross or tine-handles A B. The handle A has a slot, through which the handle B is made to pass, and in which it moves on a pivot, x, which unites the said handles, which are curved so as to work freely, and extend through the top plate J, and heads or blocks K, and are secured below by the ends of the brace-handles I I'. The brace-handles are secured above by a rivet to the block or tine-handles A B. The brace-handle I being continued, forming a quadrant link, H, which embraces the tine-handle B, as a guide to steady and secure the motions of the combined parts. The extended upper portion of the tine-handle A is provided with a loop-opening and friction-roller, G, for the rope F, which rope has a loop or link, E, at its terminus. The prolonged tine-arm B, on its upward curved extremity, enters a slotted head or cap, D, which cap is held by a pivot, P, with a hook above, and a prolonged straight or slightly curved leg or bar, d, near its lower end, when set, on said tine-handle B. The curved tripper C is attached by a pivot y. This tripper has a triangular shoulder, N, on its lower extremity, or under the handle B aforesaid. Said tripper C is carried upwards, and bent down as shown, to its ringed terminus M, for the tripper-rope m. In order to set the fork, the arm d of the hooked head D is drawn down and lodged in the triangular shoulder N of the tripper C, and the link E, on the end of the rope F, is slipped over the hooked end of D. The brace-handles I I' are used for opening the forks and plunging the tines into the hay. The rope F being carried over a pulley or ordinary fixtures, to the horse, will now act on both tine-handles A and B, firmly grasping the hay between them, and in that condition it is elevated to its destination, when, by pulling the tripper-rope m, the head D turns on its pivot P by the pressure, as the prolonged arm is disengaged, which flies up, and the hook down, releasing the link E, and thus dropping the hay previously grasped and held by the tines and their connections, as set forth.

The operation is simple and highly satisfactory.

I am aware that numerous patents have been granted for horse-forks and hay elevators, embracing various modifications and divers arrangements of the several parts used. Each device has features peculiar to that special invention; I therefore do not claim any part, separately considered. But I am not aware that any horse hay-forks, with two tines in each head, connected and combined with the brace-handles, and the arrangement of the tripper and its hooked head or cap and link contrivance in the manner described and shown, was ever before used.

What I claim as my invention, and desire to secure by Letters Patent, is—

The combination of the brace-handles I I' with the tine-handles A B above and below the tine-heads J K, to which the tines L are affixed, together with the quadrant-loop H, embracing the tine handle B, arranged and operating in the manner and for the purpose specified.

I also claim the construction of the slotted cap D, with its hook and prolonged arm d, when held upon the end of the tine-handle B, by a pivot P, in combination with the link E and tripper C, with its shoulder N, and loop M, the whole arranged and operating in the manner and for the purpose specified.

FREDERICK SNYDER.

Witnesses:
CHAS. R. FRAILEY,
JACOB STAUFFER.